United States Patent
Adams et al.

(10) Patent No.: US 7,696,293 B2
(45) Date of Patent: *Apr. 13, 2010

(54) METHOD OF NEUTRALIZING POLYSILOXANES CONTAINING ACIDIC RESIDUALS

(75) Inventors: Philip Adams, Midland, MI (US); Thomas Fryzel, Auburn, MI (US); Steven Gregg, Midland, MI (US); Robert Phillips, Cardiff (GB)

(73) Assignee: Dow Corning Corporation, Midland, MI (US)

( * ) Notice: Subject to any disclaimer, the term of this patent is extended or adjusted under 35 U.S.C. 154(b) by 987 days.

This patent is subject to a terminal disclaimer.

(21) Appl. No.: 11/401,766

(22) Filed: Apr. 11, 2006

(65) Prior Publication Data

US 2006/0264602 A1    Nov. 23, 2006

(51) Int. Cl.
*C08G 77/34* (2006.01)

(52) U.S. Cl. .......................................... 528/12; 528/482

(58) Field of Classification Search ................... 528/42, 528/122, 482, 12
See application file for complete search history.

(56) References Cited

U.S. PATENT DOCUMENTS

| | | | | |
|---|---|---|---|---|
| 3,853,933 A | * | 12/1974 | Siciliano | 556/456 |
| 4,156,689 A | * | 5/1979 | Ashby et al. | 556/451 |
| 7,479,566 B2 | * | 1/2009 | Phillips et al. | 556/443 |

OTHER PUBLICATIONS

U.S. Appl. No. 60/643,695.*

* cited by examiner

*Primary Examiner*—Kuo-Liang Peng
(74) *Attorney, Agent, or Firm*—Alan Zombeck

(57) ABSTRACT

A method of neutralizing a polysiloxane having acidic residuals is disclosed. The method involves contacting a polysiloxane having acidic residuals with a carbon solid, and separating the carbon solid from the polysiloxane. This invention is particularly useful to neutralize residual acid polymerization catalysts in organopolysiloxanes.

8 Claims, No Drawings

METHOD OF NEUTRALIZING POLYSILOXANES CONTAINING ACIDIC RESIDUALS

CROSS REFERENCE TO RELATED APPLICATIONS

None.

TECHNICAL FIELD

This invention relates to a method of neutralizing a polysiloxane having acidic residuals. In particular, the method involves contacting a polysiloxane having acidic residuals with a carbon solid, and separating the carbon solid from the polysiloxane. This method is particularly useful to neutralize residual acid polymerization catalysts in polysiloxanes.

BACKGROUND

Polysiloxanes are prepared in large scale industrial production by several techniques. Two common techniques used in industry are 1. hydrolysis of chlorosilanes to produce polysiloxane hydrolyzates, and 2. acid catalyzed equilibration of low molecular weight siloxanes. In both instances, the resulting crude polysiloxane products contain acidic residuals that must be neutralized before further use or storage. Otherwise, the resulting crude polysiloxane products will further polymerize with time, causing undesirable increases in viscosities (i.e. viscosity drift). Conventional acid neutralization techniques are commonly used to treat the resulting crude polysiloxane products. For example, the polysiloxane crude product is often contacted with a basic material such as sodium bicarbonate, calcium carbonate, or other solid particulates that are basic. While such techniques are sufficiently efficient to neutralize the majority of acidic residuals, small amounts often remain which still can lead to a viscosity drift upon storage. Thus, neutralization techniques that are more efficient than those presently known and practiced are desired. The present inventors have unexpectedly discovered such a new neutralization technique.

SUMMARY

The present invention provides a method of neutralizing a polysiloxane having acidic residuals comprising;

I) contacting the polysiloxane with a carbon solid, and
II) separating the carbon solid from the polysiloxane.

The inventive method is particularly useful to neutralize residual acid polymerization catalysts from polysiloxanes.

DETAILED DESCRIPTION

The present invention provides a method of neutralizing a polysiloxane having acidic residuals. As used herein, "acidic residuals" means any component or ingredient present at any concentration in a polysiloxane composition that can be considered acidic. Such residuals can result from the polymerization reaction to produce the polysiloxane, as for example from the hydrolysis of chlorosilanes which produces HCl as a by-product. Alternatively, acidic residuals may result from the addition of acid based polymerization catalysts.

The formation of polysiloxanes by acid catalyzed polymerization of low molecular weight silanes or siloxanes is well known in the art, for example; *Chemistry and Technology of Silicones* by Walter Noll, Academic Press, 1968, pages 219-226; and *Encyclopedia of Chemical Technology*, $4^{th}$ edition, Vol 22, pages 91-93. Typically, the following components are stirred together while heating in order to run this type of polymerization reaction: low-molecular weight cyclic or straight-chain organosiloxanes, a strong acid catalyst and molecular chain end blocker added for the purpose of regulating the degree of polymerization, the latter being exemplified by hexamethyldisiloxane and tetramethyldivinyldisiloxane. The strong acid catalysts are exemplified by sulfuric acid, hydrochloric acid, nitric acid, trifluoromethanesulfonic acid and the silyl esters of trifluoromethanesulfonic acid, such as trimethylsilyl trifluoromethanesulfonate and triethylsilyl trifluoromethanesulfonate. Trifluoromethanesulfonic acid and the silyl esters of trifluoromethanesulfonic are commonly used because they are very reactive and can be used in lower concentrations than other strong acid catalysts. The strong acid catalyst is typically added at 500 to 1,000 ppm (by weight) based on starting organosiloxane. A solvent may be used in order to reduce the viscosity of the polymerization reaction system. In most instances, the acid catalyst is present in the crude polysiloxane product, and must be removed prior to storage or end use.

Having identified acidic residuals in a polysiloxane, such residuals may be neuatralized according to the present method by contacting the polysiloxane with a carbon solid. The carbon used in the neutralization process herein may be carbon in any convenient form and of any suitable particle size. Examples include coke, charcoal, activated carbon, carbon derived from bituminous coal, carbon derived from anthracite coal, carbon derived from lignite (brown coal), carbon derived from wood, carbon derived from peat, or carbon derived from coconut shells. Carbon derived from bituminous coal is preferred herein because it is readily available commercially and is relatively inexpensive. In a first embodiment of the present invention the carbon may be added to the polysiloxane, mixed, and then separated. In a second embodiment the polysiloxane may be passed through a fixed bed of carbon from which carbon fines are subsequently removed.

One carbon solid species which may be used in the process of the invention is a granular bituminous-based activated carbon sold under the trademark BPL® 80X270 by Calgon Carbon Corporation, Pittsburgh, Pa. This material consists of carbon particles of a size that will pass through an 80 mesh screen but that are retained on a 270 mesh screen. The average particle size is greater than 53 micrometers ($\mu$m) and less than 180 ($\mu$m).

An alternative suitable carbon species is a granular bituminous-based activated carbon sold by Calgon Carbon Corporation under their trademark BPL® 12X30. This material consists of carbon particles of a size that will pass through a 12 mesh screen but that are retained on a 30 mesh screen. The average particle size is greater than 550 micrometers ($\mu$m) and less than 1410 ($\mu$m). The BPL® 12X30 had a moisture level of about 2-10 percent.

The carbon neutralizing agent may be brought into contact with the polysiloxane having acidic residuals by any suitable means such as by mixing the carbon and polysiloxane in a mixing tank and then removing the carbon from the treated neutralized polysiloxane by passing it through any conventional type of solid liquid separation device. A preferred solid liquid separation device is a plate and frame filter press, followed by treatment of the filtered effluent by any suitable means for removing particulate (especially carbon) fines to a level appropriate for the specification required for the polysiloxane such as a suitable so-called polishing filter. Devices other than plate and frame filter presses and polishing filters can also be used. For example, the polysiloxane may be passed through a fixed bed of the carbon neutralizing agent using a suitable predetermined residence time, from which the polysiloxane is passed to a post filter to remove carbon fines from the effluent. A further alternative process may include the use of one or more carbon impregnated filters to filter the polysiloxane.

The present invention is useful to remove acidic residuals from any polysiloxane or organopolysiloxane. Organopolysiloxanes are well known in the art and are often designated as comprising any number of "M" siloxy units ($R_3SiO_{0.5}$), "D" siloxy units ($R_2SiO$), "T" siloxy units ($RSiO_{1.5}$), or "Q" siloxy units ($SiO_2$) where R is independently any organic group. Alternatively, the polysiloxane may be a polydimethylsiloxane of varying viscosities. The organopolysiloxanes may also contain SiH, ie organohydridopolysiloxanes. Alternatively, the present invention may be used to neutralize acidic residues resulting from acid catalyzed polymerization reactions, or alternatively homogeneous acid catalyzed polymerization reactions of organohydridopolysiloxane having the average formula;

$R_3SiO(R_2SiO)_x(RHSiO)_ySiR_3$ or $R_2HSiO(R_2SiO)_x$
$(RHSiO)_ySiHR_2$, where x and y are greater than
0 and R is an organic group.

EXAMPLES

These examples are intended to illustrate the invention to one of ordinary skill in the art and are should not be interpreted as limiting the scope of the invention set forth in the claims. All measurements and tests were conducted at 23° C., unless indicated to the contrary.

Examples 1-7

A dimethyl, methylhydrogen, trimethylsiloxy terminated polysiloxane of average formula $R_3SiO(R_2SiO)_x(RHSiO)_y$ 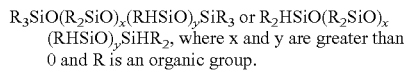 $SiR_3$, where x and y are such to provide a resulting polymer having a viscosity of 100 cSt (mm²/s) and 800 ppm SiH, was prepared by an trifluoromethane sulfonic acid catalyzed equilibration of hexamethyldisiloxane, dimethylsiloxane cyclics, and a trimethylsiloxy terminated methylhydrogen polysiloxane (having an SiH content of 1.5 wt % and a viscosity of 30 cSt (mm²/s) at 23° C.) according to techniques known in the art. The resulting crude polysiloxane was neutralized by different methods, as summarized in Table 1.

Each resulting polysiloxane product was analyzed to determine its acid number as a measure of effectiveness of the acidic residue neutralization. The analysis technique used was similar to that described in ASTM Test Methods D 664 and D 974. This method is designed to determine the concentration of acidic constituents in organic or organosilicon compound. Indicators such as bromocresol purple (BCP) or potentiometric measurements are made to determine the endpoint. Samples are swirled in a titration vessel and titrated with standard potassium hydroxide (KOH) as required to return the solution to neutral color. The results are reported as acid numbers expressed in milligrams of KOH per gram. The result of these runs is shown in Table 1.

TABLE 1

| Example # | Method of neutralization | Grams of neutralizing agent used per 225 g of polysiloxane | Acid number |
|---|---|---|---|
| 1 | None | 0 | 0.0037 |
| 2 | Sodium bicarbonate USP powdered grade | 0.27 | 0.0003 |
| 3 | Calcium Carbonate USP grade | 0.24 | 0.0007 |
| 4 | Carbon TOG NDS 50 × 200, Calgon | 0.3 | 0 |
| 5 | Select Serb Polypropylene Sorbent | 0.49 | 0.0215 |
| 6 | Sodium acetate Hydrogeneous | 0.24 | 0.0009 |
| 7 | Fuller's Earth 60/90 | 0.45 | 0.0034 |

The invention claimed is:

1. A method of neutralizing an organohydridopolysiloxane having acidic residuals comprising;
    I) contacting the organohydridopolysiloxane with a carbon solid, and
    II) separating the carbon solid from the organohydridopolysiloxane, wherein the carbon is carbon derived from bituminous coal.

2. The method of claim 1 wherein the organohydridopolysiloxane is an organopolysiloxane prepared by a homogeneous acid catalyzed polymerization reaction.

3. The method of claim 1 wherein the organohydridopolysiloxane has the average formula;

$R_3SiO(R_2SiO)_x(RHSiO)_ySiR_3$ or $R_2HSiO(R_2SiO)_x$ 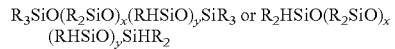
$(RHSiO)_ySiHR_2$ where x and y are greater than 0 and R is an organic group.

4. The method of claim 3 where R is methyl.

5. A method according to claim 1 wherein the carbon is a granular bituminous-based activated carbon containing carbon particles of a size that will pass through an 80 mesh screen but that are retained on a 270 mesh screen, or a granular bituminous-based activated carbon containing carbon particles of a size that will pass through a 12 mesh screen but that are retained on a 30 mesh screen.

6. A method according to claim 5 wherein the average particle size of the carbon is greater than 53 μm and less than 180 μm, or the average particle size is greater than 550 μm and less than 1410 μm.

7. A method according to claim 1 wherein the contacting in step I is performed by passing the organohydridopolysiloxane through a fixed bed of carbon, and the neutralized organohydridopolysiloxane hydrolyzate is filtered to remove carbon fines.

8. A method according to claim 1 wherein the organohydridopolysiloxane contacts the carbon by passing through one or more carbon impregnated filters.

* * * * *